(12) United States Patent
Marking (10) Patent No.: US 10,094,443 B2
(45) Date of Patent: Oct. 9, 2018

(54) BYPASS FOR A SUSPENSION DAMPER

(71) Applicant: Fox Factory, Inc., Scotts Valley, CA (US)

(72) Inventor: John Marking, El Cajon, CA (US)

(73) Assignee: Fox Factory, Inc., Scotts Valley, CA (US)

( * ) Notice: Subject to any disclaimer, the term of this patent is extended or adjusted under 35 U.S.C. 154(b) by 0 days.

(21) Appl. No.: 15/455,811

(22) Filed: Mar. 10, 2017

(65) Prior Publication Data
US 2017/0184174 A1  Jun. 29, 2017

Related U.S. Application Data

(63) Continuation of application No. 14/831,081, filed on Aug. 20, 2015, now Pat. No. 9,616,728, which is a continuation of application No. 14/154,857, filed on Jan. 14, 2014, now Pat. No. 9,120,362, which is a continuation of application No. 13/175,244, filed on Jul. 1, 2011, now Pat. No. 8,627,932, which is a continuation-in-part of application No. 13/010,697, filed on Jan. 20, 2011, now Pat. No. 8,857,580, which is a continuation-in-part of application No. 12/684,072, filed on Jan. 7, 2010, now abandoned, said application No. 13/175,244 is a continuation-in-part of application No. 12/684,072.

(60) Provisional application No. 61/296,826, filed on Jan. 20, 2010, provisional application No. 61/143,152, (Continued)

(51) Int. Cl.
*F16F 9/46* (2006.01)
*F16F 9/512* (2006.01)
*F16F 9/19* (2006.01)
*F16F 9/516* (2006.01)

(52) U.S. Cl.
CPC .............. *F16F 9/5126* (2013.01); *F16F 9/19* (2013.01); *F16F 9/466* (2013.01); *F16F 9/516* (2013.01)

(58) Field of Classification Search
CPC .............. F16F 9/46; F16F 9/461; F16F 9/468
See application file for complete search history.

(56) References Cited

U.S. PATENT DOCUMENTS

| | | |
|---|---|---|
| 1,492,731 A | 5/1924 | Kerr |
| 1,575,973 A | 3/1926 | Coleman |
| 1,948,600 A | 2/1934 | Templeton |

(Continued)

FOREIGN PATENT DOCUMENTS

| | | |
|---|---|---|
| DE | 3709447 A1 | 10/1988 |
| DE | 3711442 A1 | 10/1988 |

(Continued)

OTHER PUBLICATIONS

Electronic Translation of DE3709447A1.
(Continued)

*Primary Examiner* — Thomas W Irvin (57) ABSTRACT

A vehicle suspension damper comprises a cylinder and a piston assembly including a damping piston along with working fluid within the cylinder. A bypass permits fluid to avoid dampening resistance of the damping piston. A fluid path through the bypass is controlled by a valve that is shifted by a piston surface when the contents of at least one predetermined volume is injected against the piston surface which acts upon the valve. In one embodiment, the bypass is remotely operable.

17 Claims, 6 Drawing Sheets

Related U.S. Application Data filed on Jan. 7, 2009, provisional application No. 61/361,127, filed on Jul. 2, 2010.

(56) References Cited

U.S. PATENT DOCUMENTS

| | | | |
|---|---|---|---|
| 2,018,312 A | 10/1935 | Moulton | |
| 2,259,437 A | 10/1941 | Dean | |
| 2,492,331 A | 12/1949 | Spring | |
| 2,540,525 A | 2/1951 | Howarth et al. | |
| 2,697,600 A | 12/1954 | Gregoire | |
| 2,725,076 A | 11/1955 | Hansen et al. | |
| 2,729,308 A | 1/1956 | Koski et al. | |
| 2,784,962 A | 3/1957 | Sherburne | |
| 2,838,140 A | 6/1958 | Rasmusson et al. | |
| 2,846,028 A | 8/1958 | Gunther | |
| 2,879,971 A | 3/1959 | Demay | |
| 2,897,613 A | 8/1959 | Davidson et al. | |
| 2,941,629 A | 6/1960 | Etienne et al. | |
| 2,991,804 A | 7/1961 | Merkle | |
| 3,087,583 A | 4/1963 | Bruns | |
| 3,202,413 A | 8/1965 | Colmerauer | |
| 3,206,153 A | 9/1965 | Burke | |
| 3,284,076 A | 11/1966 | Gibson | |
| 3,286,797 A | 11/1966 | Leibfritz et al. | |
| 3,405,625 A | 10/1968 | Carlson et al. | |
| 3,419,849 A | 12/1968 | Anderson et al. | |
| 3,420,493 A | 1/1969 | Kraft et al. | |
| 3,528,700 A | 9/1970 | Janu et al. | |
| 3,556,137 A | 1/1971 | Henry et al. | |
| 3,559,027 A | 1/1971 | Arsem | |
| 3,584,331 A | 6/1971 | Richard et al. | |
| 3,603,575 A | 9/1971 | Arlasky et al. | |
| 3,605,960 A | 9/1971 | Singer | |
| 3,621,950 A | 11/1971 | Lutz | |
| 3,701,544 A | 10/1972 | Stankovich | |
| 3,714,953 A | 2/1973 | Solvang | |
| 3,750,856 A | 8/1973 | Kenworthy et al. | |
| 3,791,408 A | 2/1974 | Saitou et al. | |
| 3,830,482 A | 8/1974 | Norris | |
| 3,842,753 A | 10/1974 | Ross et al. | |
| 3,861,487 A | 1/1975 | Gill | |
| 3,941,402 A | 3/1976 | Yankowski et al. | |
| 3,981,204 A | 9/1976 | Starbard et al. | |
| 3,986,118 A | 10/1976 | Madigan | |
| 4,022,113 A | 5/1977 | Blatt et al. | |
| 4,032,829 A | 6/1977 | Schenavar et al. | |
| 4,036,335 A | 7/1977 | Thompson et al. | |
| 4,072,087 A | 2/1978 | Mueller et al. | |
| 4,103,881 A | 8/1978 | Simich | |
| 4,131,657 A | 12/1978 | Ball et al. | |
| 4,139,186 A | 2/1979 | Postema et al. | |
| 4,153,237 A | 5/1979 | Supalla | |
| 4,159,106 A | 6/1979 | Nyman et al. | |
| 4,174,098 A | 11/1979 | Baker et al. | |
| 4,183,509 A | 1/1980 | Nishikawa et al. | |
| 4,305,566 A | 12/1981 | Grawunde | |
| 4,333,668 A | 6/1982 | Hendrickson et al. | |
| 4,334,711 A | 6/1982 | Mazur et al. | |
| 4,337,850 A | 7/1982 | Shimokura et al. | |
| 4,348,016 A | 9/1982 | Milly | |
| 4,366,969 A | 1/1983 | Benya et al. | |
| 4,387,781 A | 6/1983 | Ezell et al. | |
| 4,474,363 A | 10/1984 | Numazawa et al. | |
| 4,491,207 A | 1/1985 | Boonchanta et al. | |
| 4,500,827 A | 2/1985 | Merritt et al. | |
| 4,502,673 A | 3/1985 | Clark et al. | |
| 4,546,959 A | 10/1985 | Tanno | |
| 4,548,233 A | 10/1985 | Woelfges | |
| 4,570,851 A | 2/1986 | Cirillo et al. | |
| 4,572,317 A | 2/1986 | Isono et al. | |
| 4,620,619 A | 11/1986 | Emura et al. | |
| 4,634,142 A | 1/1987 | Woods et al. | |
| 4,659,104 A | 4/1987 | Tanaka et al. | |
| 4,660,689 A | 4/1987 | Hayashi et al. | |
| 4,673,194 A | 6/1987 | Sugasawa | |
| 4,709,779 A | 12/1987 | Takehara | |
| 4,729,459 A | 3/1988 | Inagaki et al. | |
| 4,744,444 A | 5/1988 | Gillingham | |
| 4,750,735 A | 6/1988 | Furgerson et al. | |
| 4,765,648 A | 8/1988 | Mander et al. | |
| 4,773,671 A | 9/1988 | Inagaki | |
| 4,786,034 A * | 11/1988 | Heess ............... | B60G 17/0152 267/64.15 |
| 4,815,575 A | 3/1989 | Murty et al. | |
| 4,821,852 A | 4/1989 | Yokoya | |
| 4,826,207 A | 5/1989 | Yoshioka et al. | |
| 4,830,395 A | 5/1989 | Foley | |
| 4,836,578 A | 6/1989 | Soltis | |
| 4,838,394 A | 6/1989 | Lemme et al. | |
| 4,846,317 A | 7/1989 | Hudgens | |
| 4,858,733 A | 8/1989 | Noguchi et al. | |
| 4,919,166 A | 4/1990 | Sims et al. | |
| 4,936,424 A | 6/1990 | Costa | |
| 4,949,989 A | 8/1990 | Kakizaki et al. | |
| 4,958,706 A | 9/1990 | Richardson et al. | |
| 4,975,849 A | 12/1990 | Ema et al. | |
| 4,984,819 A | 1/1991 | Kakizaki et al. | |
| 5,027,303 A | 6/1991 | Witte | |
| 5,036,934 A | 8/1991 | Nishina et al. | |
| 5,040,381 A | 8/1991 | Hazen | |
| 5,044,614 A | 9/1991 | Rau | |
| 5,060,959 A | 10/1991 | Davis et al. | |
| 5,076,404 A | 12/1991 | Gustafsson | |
| 5,080,392 A | 1/1992 | Bazergui | |
| 5,105,918 A | 4/1992 | Hagiwara et al. | |
| 5,113,980 A | 5/1992 | Furrer et al. | |
| 5,152,547 A | 10/1992 | Davis | |
| 5,161,653 A | 11/1992 | Hare | |
| 5,163,742 A | 11/1992 | Topfer et al. | |
| 5,178,242 A | 1/1993 | Nakamura et al. | |
| 5,186,481 A | 2/1993 | Turner | |
| 5,203,584 A | 4/1993 | Butsuen et al. | |
| 5,207,774 A | 5/1993 | Wolfe et al. | |
| 5,230,364 A | 7/1993 | Leng et al. | |
| 5,236,169 A | 8/1993 | Johnsen et al. | |
| 5,248,014 A | 9/1993 | Ashiba | |
| 5,259,487 A | 11/1993 | Petek et al. | |
| 5,263,559 A | 11/1993 | Mettner | |
| 5,265,902 A | 11/1993 | Lewis | |
| 5,277,283 A | 1/1994 | Yamaoka et al. | |
| 5,284,330 A | 2/1994 | Carlson et al. | |
| 5,293,971 A | 3/1994 | Kanari | |
| 5,307,907 A | 5/1994 | Nakamura et al. | |
| 5,318,066 A | 6/1994 | Burgorf et al. | |
| 5,347,186 A | 9/1994 | Konotchick et al. | |
| 5,348,112 A | 9/1994 | Vaillancourt | |
| 5,372,224 A | 12/1994 | Samonil et al. | |
| 5,381,952 A | 1/1995 | Duprez | |
| 5,390,949 A | 2/1995 | Naganathan et al. | |
| 5,396,973 A | 3/1995 | Schwemmer et al. | |
| 5,398,787 A | 3/1995 | Woessner et al. | |
| 5,413,196 A | 5/1995 | Forster | |
| 5,467,280 A | 11/1995 | Kimura | |
| 5,480,011 A | 1/1996 | Nagai et al. | |
| 5,551,674 A | 9/1996 | Johnsen | |
| 5,553,836 A | 9/1996 | Ericson | |
| 5,578,877 A | 11/1996 | Tiemann | |
| 5,588,510 A | 12/1996 | Wilke | |
| 5,597,180 A | 1/1997 | Ganzel et al. | |
| 5,598,337 A | 1/1997 | Butsuen et al. | |
| 5,601,164 A | 2/1997 | Ohsaki et al. | |
| 5,651,433 A | 7/1997 | Wirth et al. | |
| 5,657,840 A | 8/1997 | Lizell | |
| 5,687,575 A | 11/1997 | Keville et al. | |
| 5,699,885 A | 12/1997 | Forster | |
| 5,722,645 A | 3/1998 | Reitter | |
| 5,803,443 A | 9/1998 | Chang | |
| 5,806,159 A | 9/1998 | Inoue et al. | |
| 5,810,128 A | 9/1998 | Eriksson et al. | |
| 5,813,456 A | 9/1998 | Milner et al. | |
| 5,813,731 A | 9/1998 | Newman et al. | |
| 5,818,132 A | 10/1998 | Konotchick et al. | |
| 5,826,935 A | 10/1998 | Defreitas et al. | |
| 5,872,418 A | 2/1999 | Wischnewskiy | |

(56) References Cited

U.S. PATENT DOCUMENTS

| | | | |
|---|---|---|---|
| 5,884,921 | A | 3/1999 | Katsuda et al. |
| 5,937,975 | A | 8/1999 | Forster |
| 5,947,238 | A | 9/1999 | Jolly et al. |
| 5,952,823 | A | 9/1999 | Sprecher et al. |
| 5,954,318 | A | 9/1999 | Kluhsman |
| 5,956,951 | A | 9/1999 | O'Callaghan |
| 5,957,252 | A | 9/1999 | Berthold |
| 5,971,116 | A | 10/1999 | Franklin |
| 5,992,450 | A | 11/1999 | Parker et al. |
| 5,996,745 | A | 12/1999 | Jones et al. |
| 5,996,746 | A | 12/1999 | Turner et al. |
| 5,999,868 | A | 12/1999 | Beno et al. |
| 6,000,702 | A | 12/1999 | Streiter |
| 6,035,979 | A | 3/2000 | Foerster |
| 6,058,340 | A | 5/2000 | Uchiyama et al. |
| 6,067,490 | A | 5/2000 | Ichimaru et al. |
| 6,073,536 | A | 6/2000 | Campbell |
| 6,073,700 | A | 6/2000 | Tsuji et al. |
| 6,073,736 | A | 6/2000 | Franklin |
| 6,092,011 | A | 7/2000 | Hiramoto et al. |
| 6,131,709 | A | 10/2000 | Jolly et al. |
| 6,135,434 | A | 10/2000 | Marking |
| 6,141,969 | A | 11/2000 | Launchbury et al. |
| 6,151,930 | A | 11/2000 | Carlson |
| 6,179,098 | B1 | 1/2001 | Hayakawa et al. |
| 6,199,669 | B1 | 3/2001 | Huang et al. |
| 6,213,263 | B1 | 4/2001 | De Frenne |
| 6,215,217 | B1 | 4/2001 | Kurosawa et al. |
| 6,217,049 | B1 | 4/2001 | Becker |
| 6,244,398 | B1 | 6/2001 | Girvin et al. |
| 6,254,067 | B1 | 7/2001 | Yih |
| 6,279,702 | B1 | 8/2001 | Koh |
| 6,293,530 | B1 | 9/2001 | Delorenzis et al. |
| 6,296,092 | B1 | 10/2001 | Marking et al. |
| 6,311,962 | B1 | 11/2001 | Marking |
| 6,318,525 | B1 | 11/2001 | Vignocchi et al. |
| 6,322,468 | B1 | 11/2001 | Wing et al. |
| 6,343,807 | B1 | 2/2002 | Rathbun |
| 6,360,857 | B1 * | 3/2002 | Fox .................. F16F 9/3485 188/281 |
| 6,371,262 | B1 | 4/2002 | Katou et al. |
| 6,371,267 | B1 | 4/2002 | Kao et al. |
| 6,378,885 | B1 | 4/2002 | Ellsworth et al. |
| 6,389,341 | B1 | 5/2002 | Davis |
| 6,390,747 | B1 | 5/2002 | Commins |
| 6,401,883 | B1 | 6/2002 | Nyce et al. |
| 6,415,895 | B2 | 7/2002 | Marking et al. |
| 6,418,360 | B1 | 7/2002 | Spivey et al. |
| 6,427,812 | B2 | 8/2002 | Crawley et al. |
| 6,434,460 | B1 | 8/2002 | Uchino et al. |
| 6,446,771 | B1 | 9/2002 | Sintorn et al. |
| 6,474,454 | B2 | 11/2002 | Matsumoto et al. |
| 6,474,753 | B1 | 11/2002 | Rieth et al. |
| 6,501,554 | B1 | 12/2002 | Hackney et al. |
| 6,502,837 | B1 | 1/2003 | Hamilton et al. |
| 6,510,929 | B1 | 1/2003 | Gordaninejad et al. |
| 6,520,297 | B1 | 2/2003 | Lumpkin et al. |
| 6,592,136 | B2 | 7/2003 | Becker et al. |
| 6,619,615 | B1 | 9/2003 | Mayr et al. |
| 6,648,109 | B2 | 11/2003 | Farr et al. |
| 6,659,240 | B2 | 12/2003 | Dernebo |
| 6,672,687 | B2 | 1/2004 | Nishio |
| 6,732,033 | B2 | 5/2004 | Laplante et al. |
| 6,782,980 | B2 | 8/2004 | Nakadate |
| 6,817,454 | B2 | 11/2004 | Nezu et al. |
| 6,840,257 | B2 | 1/2005 | Dario et al. |
| 6,857,625 | B2 | 2/2005 | Löser et al. |
| 6,863,291 | B2 | 3/2005 | Miyoshi |
| 6,905,203 | B2 | 6/2005 | Kremers et al. |
| 6,920,951 | B2 | 7/2005 | Song et al. |
| 6,923,853 | B2 | 8/2005 | Kremers et al. |
| 6,935,157 | B2 | 8/2005 | Miller |
| 6,952,060 | B2 | 10/2005 | Goldner et al. |
| 6,959,921 | B2 | 11/2005 | Rose |
| 6,966,412 | B2 | 11/2005 | Braswell et al. |
| 6,978,871 | B2 | 12/2005 | Holiviers |
| 6,978,872 | B2 | 12/2005 | Turner |
| 6,991,076 | B2 | 1/2006 | McAndrews |
| 7,025,367 | B2 | 4/2006 | McKinnon et al. |
| 7,076,351 | B2 | 7/2006 | Hamilton et al. |
| 7,128,192 | B2 | 10/2006 | Fox |
| 7,135,794 | B2 | 11/2006 | Kühnel |
| 7,147,207 | B2 | 12/2006 | Jordan et al. |
| 7,163,222 | B2 | 1/2007 | Becker et al. |
| 7,208,845 | B2 | 4/2007 | Schaefer et al. |
| 7,234,575 | B2 | 6/2007 | Anderfaas et al. |
| 7,234,680 | B2 | 6/2007 | Hull et al. |
| 7,243,763 | B2 | 7/2007 | Carlson |
| 7,270,221 | B2 | 9/2007 | McAndrews |
| 7,287,760 | B1 | 10/2007 | Quick et al. |
| 7,293,764 | B2 | 11/2007 | Fang |
| 7,299,112 | B2 | 11/2007 | Laplante et al. |
| 7,316,406 | B2 | 1/2008 | Kimura et al. |
| 7,325,660 | B2 | 2/2008 | Norgaard et al. |
| 7,363,129 | B1 | 4/2008 | Barnicle et al. |
| 7,374,028 | B2 | 5/2008 | Fox |
| 7,397,355 | B2 | 7/2008 | Tracy |
| 7,413,063 | B1 | 8/2008 | Davis |
| 7,422,092 | B2 | 9/2008 | Hitchcock et al. |
| 7,441,638 | B2 | 10/2008 | Hanawa |
| 7,469,910 | B2 | 12/2008 | Münster et al. |
| 7,484,603 | B2 | 2/2009 | Fox |
| 7,490,705 | B2 | 2/2009 | Fox |
| 7,523,617 | B2 | 4/2009 | Colpitts et al. |
| 7,569,952 | B1 | 8/2009 | Bono et al. |
| 7,581,743 | B2 | 9/2009 | Graney et al. |
| 7,591,352 | B2 | 9/2009 | Hanawa |
| 7,600,616 | B2 | 10/2009 | Anderfaas et al. |
| 7,628,259 | B2 | 12/2009 | Norgaard et al. |
| 7,631,882 | B2 | 12/2009 | Hirao et al. |
| 7,654,369 | B2 | 2/2010 | Murray et al. |
| 7,673,936 | B2 | 3/2010 | Hsu et al. |
| 7,684,911 | B2 | 3/2010 | Seifert et al. |
| 7,694,785 | B2 | 4/2010 | Nakadate |
| 7,694,987 | B2 | 4/2010 | McAndrews |
| 7,722,056 | B2 | 5/2010 | Inoue et al. |
| 7,722,069 | B2 | 5/2010 | Shirai |
| 7,726,042 | B2 | 6/2010 | Meschan |
| 7,730,906 | B2 | 6/2010 | Kleinert et al. |
| 7,770,701 | B1 | 8/2010 | Davis |
| 7,779,974 | B2 | 8/2010 | Timoney et al. |
| 7,795,711 | B2 | 9/2010 | Sauciuc et al. |
| 7,837,213 | B2 | 11/2010 | Colegrove et al. |
| 7,857,325 | B2 | 12/2010 | Copsey et al. |
| 7,909,348 | B2 | 3/2011 | Klieber et al. |
| 7,931,132 | B2 | 4/2011 | Braun |
| 7,946,163 | B2 | 5/2011 | Gartner |
| 7,975,814 | B2 | 7/2011 | Soederdahl |
| 8,016,349 | B2 | 9/2011 | Mouri et al. |
| 8,056,392 | B2 | 11/2011 | Ryan et al. |
| 8,087,676 | B2 | 1/2012 | McIntyre |
| 8,091,910 | B2 | 1/2012 | Hara et al. |
| 8,104,591 | B2 | 1/2012 | Barefoot et al. |
| 8,127,900 | B2 | 3/2012 | Inoue |
| 8,136,877 | B2 | 3/2012 | Walsh et al. |
| 8,151,952 | B2 * | 4/2012 | Nieder-Vahrenholz ................... B60G 17/08 137/487.5 |
| 8,191,964 | B2 | 6/2012 | Hsu et al. |
| 8,210,106 | B2 | 7/2012 | Tai et al. |
| 8,210,330 | B2 | 7/2012 | Vandewal |
| 8,256,587 | B2 | 9/2012 | Bakke et al. |
| 8,262,062 | B2 | 9/2012 | Kamo et al. |
| 8,262,100 | B2 | 9/2012 | Thomas |
| 8,286,982 | B2 | 10/2012 | Plantet et al. |
| 8,291,889 | B2 | 10/2012 | Shafer et al. |
| 8,292,274 | B2 | 10/2012 | Adoline et al. |
| 8,307,965 | B2 * | 11/2012 | Foster .................. F16F 9/512 188/281 |
| 8,308,124 | B2 | 11/2012 | Hsu |
| 8,317,261 | B2 | 11/2012 | Walsh et al. |
| 8,336,683 | B2 | 12/2012 | McAndrews et al. |
| 8,393,446 | B2 | 3/2013 | Haugen |
| 8,413,773 | B2 | 4/2013 | Anderfaas et al. |

(56) References Cited

U.S. PATENT DOCUMENTS

| | | |
|---|---|---|
| 8,423,244 B2 | 4/2013 | Proemm et al. |
| 8,458,080 B2 | 6/2013 | Shirai |
| 8,550,551 B2 | 10/2013 | Shirai |
| 8,556,048 B2 | 10/2013 | Maeda et al. |
| 8,556,049 B2 | 10/2013 | Jee |
| 8,596,663 B2 | 12/2013 | Shirai et al. |
| 8,627,932 B2 | 1/2014 | Marking |
| 8,641,073 B2 | 2/2014 | Lee et al. |
| 8,655,548 B2 | 2/2014 | Ichida et al. |
| 8,744,699 B2 | 6/2014 | Yamaguchi et al. |
| 8,752,682 B2 | 6/2014 | Park et al. |
| 8,770,357 B2 | 7/2014 | Sims et al. |
| 8,781,680 B2 | 7/2014 | Ichida et al. |
| 8,781,690 B2 | 7/2014 | Hara et al. |
| 8,814,109 B2 | 8/2014 | Calendrille et al. |
| 8,833,786 B2 | 9/2014 | Camp et al. |
| 8,838,335 B2 | 9/2014 | Bass et al. |
| 8,857,580 B2 | 10/2014 | Marking |
| 8,888,115 B2 | 11/2014 | Chubbuck et al. |
| 8,950,771 B2 | 2/2015 | Felsl et al. |
| 8,955,653 B2 | 2/2015 | Marking |
| 8,967,343 B2 | 3/2015 | Battlogg et al. |
| 8,991,571 B2 | 3/2015 | Murakami |
| 9,033,122 B2 | 5/2015 | Ericksen et al. |
| 9,038,791 B2 | 5/2015 | Marking |
| 9,073,592 B2 | 7/2015 | Hsu |
| 9,120,362 B2 | 9/2015 | Marking |
| 9,126,647 B2 | 9/2015 | Kuo |
| 9,140,325 B2 | 9/2015 | Cox et al. |
| 9,157,523 B2 | 10/2015 | Miki et al. |
| 9,194,456 B2 | 11/2015 | Laird et al. |
| 9,199,690 B2 | 12/2015 | Watarai |
| 9,239,090 B2 | 1/2016 | Marking et al. |
| 9,278,598 B2 | 3/2016 | Galasso et al. |
| 9,353,818 B2 | 5/2016 | Marking |
| 9,366,307 B2 | 6/2016 | Marking |
| 9,422,018 B2 | 8/2016 | Pelot et al. |
| 9,452,654 B2 | 9/2016 | Ericksen |
| 9,550,405 B2 | 1/2017 | Marking et al. |
| 9,556,925 B2 | 1/2017 | Marking |
| 9,616,728 B2 | 4/2017 | Marking |
| 9,663,181 B2 | 5/2017 | Ericksen et al. |
| 9,682,604 B2 | 6/2017 | Cox et al. |
| 9,784,333 B2 | 10/2017 | Marking |
| 10,036,443 B2 | 7/2018 | Galasso et al. |
| 10,040,329 B2 | 8/2018 | Ericksen et al. |
| 2001/0017334 A1 | 8/2001 | Vincent |
| 2001/0042663 A1 | 11/2001 | Marking et al. |
| 2002/0000352 A1 | 1/2002 | Matsumoto et al. |
| 2002/0032508 A1 | 3/2002 | Uchino et al. |
| 2002/0050518 A1 | 5/2002 | Roustaei |
| 2002/0063469 A1 | 5/2002 | Nishio |
| 2002/0089107 A1 | 7/2002 | Koh |
| 2002/0121416 A1 | 9/2002 | Katayama et al. |
| 2002/0130000 A1 | 9/2002 | Lisenker et al. |
| 2002/0130003 A1 | 9/2002 | Lisenker et al. |
| 2002/0185581 A1 | 12/2002 | Trask et al. |
| 2003/0001346 A1 | 1/2003 | Hamilton et al. |
| 2003/0001358 A1 | 1/2003 | Becker et al. |
| 2003/0034697 A1 | 2/2003 | Goldner et al. |
| 2003/0051954 A1 | 3/2003 | Sendrea |
| 2003/0065430 A1 | 4/2003 | Lu et al. |
| 2003/0075403 A1 | 4/2003 | Dernebo |
| 2003/0103651 A1 | 6/2003 | Novak |
| 2003/0160369 A1 | 8/2003 | Laplante et al. |
| 2004/0017455 A1 | 1/2004 | Kremers et al. |
| 2004/0021754 A1 | 2/2004 | Kremers et al. |
| 2004/0075350 A1 | 4/2004 | Kuhnel |
| 2004/0099312 A1 | 5/2004 | Boyer et al. |
| 2004/0208687 A1 | 10/2004 | Sicz et al. |
| 2004/0222056 A1 | 11/2004 | Fox |
| 2004/0256778 A1 | 12/2004 | Verriet |
| 2005/0077131 A1 | 4/2005 | Russell |
| 2005/0098401 A1 | 5/2005 | Hamilton et al. |
| 2005/0110229 A1 | 5/2005 | Kimura et al. |
| 2005/0121269 A1 | 6/2005 | Namuduri |
| 2005/0173849 A1 | 8/2005 | Vandewal |
| 2005/0199455 A1 | 9/2005 | Browne et al. |
| 2006/0064223 A1 | 3/2006 | Voss |
| 2006/0065496 A1 | 3/2006 | Fox et al. |
| 2006/0066074 A1 | 3/2006 | Turner et al. |
| 2006/0081431 A1 | 4/2006 | Breese et al. |
| 2006/0096817 A1 | 5/2006 | Norgaard et al. |
| 2006/0113834 A1 | 6/2006 | Hanawa |
| 2006/0124414 A1 | 6/2006 | Hanawa |
| 2006/0163551 A1 | 7/2006 | Coenen et al. |
| 2006/0163787 A1 | 7/2006 | Munster et al. |
| 2006/0175792 A1 | 8/2006 | Sicz et al. |
| 2006/0213082 A1 | 9/2006 | Meschan |
| 2006/0219503 A1 | 10/2006 | Kim |
| 2006/0225976 A1 | 10/2006 | Nakadate |
| 2006/0237272 A1 | 10/2006 | Huang |
| 2006/0289258 A1 | 12/2006 | Fox |
| 2007/0007743 A1 | 1/2007 | Becker et al. |
| 2007/0008096 A1 | 1/2007 | Tracy |
| 2007/0034464 A1 | 2/2007 | Barefoot |
| 2007/0039790 A1 | 2/2007 | Timoney et al. |
| 2007/0051573 A1 | 3/2007 | Norgaard et al. |
| 2007/0088475 A1 | 4/2007 | Nordgren et al. |
| 2007/0090518 A1 | 4/2007 | Sauciuc et al. |
| 2007/0119669 A1 | 5/2007 | Anderfaas et al. |
| 2008/0006494 A1 | 1/2008 | Vandewal |
| 2008/0018065 A1 | 1/2008 | Hirao et al. |
| 2008/0029730 A1 | 2/2008 | Kamo et al. |
| 2008/0041677 A1 | 2/2008 | Namuduri |
| 2008/0059025 A1 | 3/2008 | Furuichi et al. |
| 2008/0067019 A1 | 3/2008 | Jensen et al. |
| 2008/0093820 A1 | 4/2008 | McAndrews |
| 2008/0099968 A1 | 5/2008 | Schroeder |
| 2008/0116622 A1 | 5/2008 | Fox |
| 2008/0185244 A1 | 8/2008 | Maeda et al. |
| 2008/0250844 A1 | 10/2008 | Gartner |
| 2008/0303320 A1 | 12/2008 | Schranz et al. |
| 2008/0314706 A1 | 12/2008 | Lun et al. |
| 2009/0001684 A1 | 1/2009 | McAndrews et al. |
| 2009/0020382 A1 | 1/2009 | Van Weelden et al. |
| 2009/0071773 A1 | 3/2009 | Lun |
| 2009/0121398 A1 | 5/2009 | Inoue |
| 2009/0171532 A1 | 7/2009 | Ryan et al. |
| 2009/0192673 A1 | 7/2009 | Song et al. |
| 2009/0200126 A1 | 8/2009 | Kondo et al. |
| 2009/0236807 A1 | 9/2009 | Wootten et al. |
| 2009/0261542 A1 | 10/2009 | McIntyre |
| 2009/0277736 A1 | 11/2009 | McAndrews et al. |
| 2009/0288924 A1 | 11/2009 | Murray et al. |
| 2009/0294231 A1 | 12/2009 | Carlson et al. |
| 2009/0302558 A1 | 12/2009 | Shirai |
| 2009/0324327 A1 | 12/2009 | McAndrews et al. |
| 2010/0010709 A1 | 1/2010 | Song |
| 2010/0032254 A1 | 2/2010 | Anderfaas et al. |
| 2010/0044975 A1 | 2/2010 | Yablon et al. |
| 2010/0059964 A1 | 3/2010 | Morris |
| 2010/0066051 A1 | 3/2010 | Haugen |
| 2010/0109277 A1 | 5/2010 | Furrer |
| 2010/0170760 A1 | 7/2010 | Marking |
| 2010/0207351 A1 | 8/2010 | Klieber et al. |
| 2010/0244340 A1 | 9/2010 | Wootten et al. |
| 2010/0252972 A1 | 10/2010 | Cox et al. |
| 2010/0276238 A1 | 11/2010 | Crasset |
| 2010/0276906 A1 | 11/2010 | Galasso et al. |
| 2010/0308628 A1 | 12/2010 | Hsu et al. |
| 2010/0314917 A1 | 12/2010 | Hsieh et al. |
| 2010/0327542 A1 | 12/2010 | Hara et al. |
| 2011/0067965 A1 | 3/2011 | McAndrews |
| 2011/0086686 A1 | 4/2011 | Avent et al. |
| 2011/0095507 A1 | 4/2011 | Plantet et al. |
| 2011/0097139 A1 | 4/2011 | Hsu et al. |
| 2011/0109060 A1 | 5/2011 | Earle et al. |
| 2011/0127706 A1 | 6/2011 | Sims et al. |
| 2011/0174582 A1 | 7/2011 | Wootten et al. |
| 2011/0202236 A1 | 8/2011 | Galasso et al. |
| 2011/0204201 A1 | 8/2011 | Kodama et al. |
| 2011/0214956 A1 | 9/2011 | Marking |
| 2011/0257848 A1 | 10/2011 | Shirai |

(56) References Cited

U.S. PATENT DOCUMENTS

| | | |
|---|---|---|
| 2011/0284333 A1 | 11/2011 | Krog et al. |
| 2011/0315494 A1 | 12/2011 | Marking |
| 2012/0006949 A1 | 1/2012 | Laird et al. |
| 2012/0018263 A1 | 1/2012 | Marking |
| 2012/0018264 A1 | 1/2012 | King |
| 2012/0048665 A1 | 3/2012 | Marking |
| 2012/0080279 A1 | 4/2012 | Galasso et al. |
| 2012/0181126 A1 | 7/2012 | De Kock |
| 2012/0222927 A1 | 9/2012 | Marking |
| 2012/0228906 A1 | 9/2012 | McAndrews et al. |
| 2012/0253599 A1 | 10/2012 | Shirai |
| 2012/0253600 A1 | 10/2012 | Ichida et al. |
| 2012/0274043 A1 | 11/2012 | Lee et al. |
| 2012/0305350 A1 | 12/2012 | Ericksen et al. |
| 2012/0312648 A1 | 12/2012 | Yu et al. |
| 2013/0001030 A1 | 1/2013 | Goldasz et al. |
| 2013/0037361 A1 | 2/2013 | Park et al. |
| 2013/0090195 A1 | 4/2013 | Yamaguchi et al. |
| 2013/0119634 A1 | 5/2013 | Camp et al. |
| 2013/0144489 A1 | 6/2013 | Galasso et al. |
| 2013/0168195 A1 | 7/2013 | Park et al. |
| 2013/0292218 A1 | 11/2013 | Ericksen et al. |
| 2013/0333993 A1 | 12/2013 | Yu |
| 2014/0008160 A1 | 1/2014 | Marking et al. |
| 2014/0027219 A1 | 1/2014 | Marking et al. |
| 2014/0048365 A1 | 2/2014 | Kim |
| 2014/0061419 A1 | 3/2014 | Wehage et al. |
| 2015/0081171 A1 | 3/2015 | Ericksen et al. |
| 2015/0197308 A1 | 7/2015 | Butora et al. |
| 2016/0153516 A1 | 6/2016 | Marking |
| 2016/0185178 A1 | 6/2016 | Galasso et al. |
| 2016/0265615 A1 | 9/2016 | Marking |
| 2016/0290431 A1 | 10/2016 | Marking |
| 2016/0355226 A1 | 12/2016 | Pelot et al. |
| 2017/0008363 A1 | 1/2017 | Ericksen et al. |
| 2017/0136843 A1 | 5/2017 | Marking |
| 2017/0259876 A1* | 9/2017 | Ericksen ............... B62K 25/08 |
| 2017/0291466 A1 | 10/2017 | Tong |
| 2018/0010666 A1 | 1/2018 | Marking |
| 2018/0031071 A1 | 2/2018 | Marking |

FOREIGN PATENT DOCUMENTS

| | | |
|---|---|---|
| DE | 3738048 A1 | 5/1989 |
| DE | 3924166 C1 | 2/1991 |
| DE | 4029090 A1 | 3/1992 |
| DE | 4406918 A1 | 9/1994 |
| DE | 10326675 A1 | 12/2004 |
| DE | 202010012738 U1 | 12/2010 |
| EP | 207409 A2 | 1/1987 |
| EP | 304801 A2 | 3/1989 |
| EP | 1241087 A1 | 9/2002 |
| EP | 1355209 A1 | 10/2003 |
| EP | 1623856 A2 | 2/2006 |
| EP | 1757473 A2 | 2/2007 |
| EP | 2103512 A2 | 9/2009 |
| EP | 2248691 A1 | 11/2010 |
| EP | 2357098 A2 | 8/2011 |
| EP | 2410203 A2 | 1/2012 |
| EP | 2479095 A2 | 7/2012 |
| EP | 2495472 A2 | 9/2012 |
| EP | 2357098 B1 | 10/2014 |
| EP | 2848582 A1 | 3/2015 |
| GB | 2289111 A | 11/1995 |
| JP | 57173632 A | 10/1982 |
| JP | 57182506 A | 11/1982 |
| JP | 01106721 A | 4/1989 |
| JP | H0193637 A | 4/1989 |
| JP | H03113139 A | 5/1991 |
| JP | 04203540 A | 7/1992 |
| JP | 05149364 A | 6/1993 |
| JP | H084818 A | 1/1996 |
| JP | 2007302211 A | 11/2007 |
| KR | 20070076226 A | 7/2007 |
| WO | 98/40231 | 9/1998 |
| WO | 99/06231 | 2/1999 |
| WO | 0027658 A1 | 5/2000 |

OTHER PUBLICATIONS

Nilsson, "Opposition Letter Against EP-2357098", Oct. 13, 2017, 7 pages.

English language abstract for EP 0207409 (no date).

European Search Report, European Patent Application No. 14189773.6, dated May 4, 2015, 4 Pages.

EP Search Report for European Application No. 15163428.4, dated Jul. 3, 2017, 7 Pages.

"European Patent Office Final Decision dated Mar. 21, 2013", European Patent Application No. 10161906.2.

"European Search Report and Written Opinion, European Patent Application No. 13165362.8", dated Sep. 24, 2014, 6 Pages.

"European Search Report for European Application No. 10187320, 12 pages, dated Sep. 25, 2017 (Sep. 25, 2017)".

"European Search Report for European Application No. 11153607, 3 pages,dated Aug. 10, 2012 (Aug. 10, 2012))".

"European Search Report for European Application No. 11172553, 2 pages, dated Sep. 25, 2017 (Sep. 25, 2017)".

"European Search Report for European Application No. 11175126, 2 pages, dated Sep. 25, 2017 (Sep. 25, 2017)".

"European Search Report for European Application No. 12184150, 10 pages, dated Dec. 12, 2017 (Dec. 12, 2017)".

"European Search Report for European Application No. 13174817.0, 13 pages, dated Jan. 8, 2018 (Jan. 8, 2018))".

"European Search Report for European Application No. 17188022, 9 pages, dated Feb. 1, 2018 (Feb. 1, 2018))".

Shiozaki, et al., "SP-861-Vehicle Dynamics and Electronic Controlled Suspensions SAE Technical Paper Series No. 910661", International Congress and Exposition, Detroit, Mich., Feb. 25-Mar. 1, 1991.

Smith, ""The Bump Stop" in Engineer to win—Chapter 13: Springs and Shock Absorbers", MBI Publishing Company and Motorbooks, USA XP055430818, ISBN: 978-0-87938-186-8, Dec. 31, 1984, 207.

Fachkunde Fahrradtechnik 4 Auflage, Gressmann_Inhaltv und S, 2011, 206-207.

Statement of Grounds of Appeal, EP App. No. 11153607A, May 28, 2018, 88 Pages.

Grounds of Appeal, EP App. No. 11153607.4, Jun. 1, 2018, 28 Pages.

Puhn, "How to Make Your Car Handle", HPBooks, 1981, 7 Pages.

\* cited by examiner

BYPASS FOR A SUSPENSION DAMPER

CROSS-REFERENCE TO RELATED APPLICATIONS

This application claims priority to and is a continuation of the co-pending patent application, U.S. patent application Ser. No. 14/831,081, filed on Aug. 20, 2015, entitled "BYPASS FOR A SUSPENSION DAMPER", by John Marking, and assigned to the assignee of the present invention, the disclosure of which is hereby incorporated herein by reference in its entirety.

The U.S. patent application Ser. No. 14/831,081 is a continuation application of and claims the benefit of U.S. patent application Ser. No. 14/154,857, filed on Jan. 14, 2014 and is now issued U.S. Pat. No. 9,120,362 entitled "BYPASS FOR A SUSPENSION DAMPER", by John Marking, and assigned to the assignee of the present invention, the disclosure of which is hereby incorporated herein by reference in its entirety.

The U.S. patent application Ser. No. 14/154,857 is a continuation application of and claims the benefit of U.S. patent application Ser. No. 13/175,244, filed on Jul. 1, 2011 and is now issued U.S. Pat. No. 8,627,932, entitled "BYPASS FOR A SUSPENSION DAMPER" by John Marking, and assigned to the assignee of the present application, which is incorporated herein, in its entirety, by reference.

The U.S. patent application Ser. No. 13/175,244 claims priority to and benefit of U.S. Provisional Patent Application 61/361,127 filed on Jul. 2, 2010, entitled "BYPASS LOCK-OUT VALVE FOR A SUSPENSION DAMPER" by John Marking, which is incorporated herein, in its entirety, by reference.

The U.S. patent application Ser. No. 13/175,244 is a continuation-in-part application of and claims the benefit of U.S. patent application Ser. No. 13/010,697, filed on Jan. 1, 2011 and is now issued U.S. Pat. No. 8,857,580, entitled "REMOTELY OPERATED BYPASS FOR A SUSPENSION DAMPER" by John Marking, and assigned to the assignee of the present application, which is incorporated herein, in its entirety, by reference.

The U.S. patent application Ser. No. 13/010,697 claims priority to and benefit of U.S. Provisional Patent Application 61/296,826 filed on Jan. 20, 2010, entitled "BYPASS LOCK-OUT VALVE FOR A SUSPENSION DAMPER" by John Marking, which is incorporated herein, in its entirety, by reference.

The U.S. patent application Ser. No. 13/010,244 is a continuation-in-part application of and benefit of U.S. patent application Ser. No. 12/684,072, filed on Jan. 7, 2010 and is now abandoned, entitled "REMOTELY OPERATED BYPASS FOR A SUSPENSION DAMPER" by John Marking, and assigned to the assignee of the present application, which is incorporated herein, in its entirety, by reference.

The U.S. patent application Ser. No. 13/175,244 is a continuation-in-part application of and claims the benefit of U.S. patent application Ser. No. 12/684,072, filed on Jan. 7, 2010 and is now abandoned, entitled "REMOTELY OPERATED BYPASS FOR A SUSPENSION DAMPER" by John Marking, and assigned to the assignee of the present application, which is incorporated herein, in its entirety, by reference.

The U.S. patent application Ser. No. 12/684,072 claims priority to and benefit of U.S. Provisional Patent Application 61/143,153 filed on Jan. 7, 2009, entitled "REMOTE BYPASS LOCK-OUT" by John Marking, which is incorporated herein, in its entirety, by reference.

BACKGROUND

Field of the Invention

Embodiments of the present invention generally relate to a damper assembly for a vehicle. More specifically, certain embodiments relate to a remotely operated bypass device used in conjunction with a vehicle damper.

Vehicle suspension systems typically include a spring component or components and a dampening component or components. Typically, mechanical springs, like helical springs are used with some type of viscous fluid-based dampening mechanism and the two are mounted functionally in parallel. In some instances features of the damper or spring are user-adjustable. What is needed is an improved method and apparatus for adjusting dampening characteristics, including remote adjustment.

SUMMARY OF THE INVENTION

The invention includes a vehicle suspension damper comprising a cylinder and a piston assembly comprising a damping piston along with working fluid within the cylinder. A bypass permits fluid to avoid dampening resistance of the damping piston. A fluid path through the bypass is controlled by a valve that is shifted by a piston surface when the contents of at least one predetermined volume is injected against the piston surface which acts upon the valve. In one embodiment, the bypass is remotely operable.

BRIEF DESCRIPTION OF THE DRAWINGS

So that the manner in which the above recited features can be understood in detail, a more particular description may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
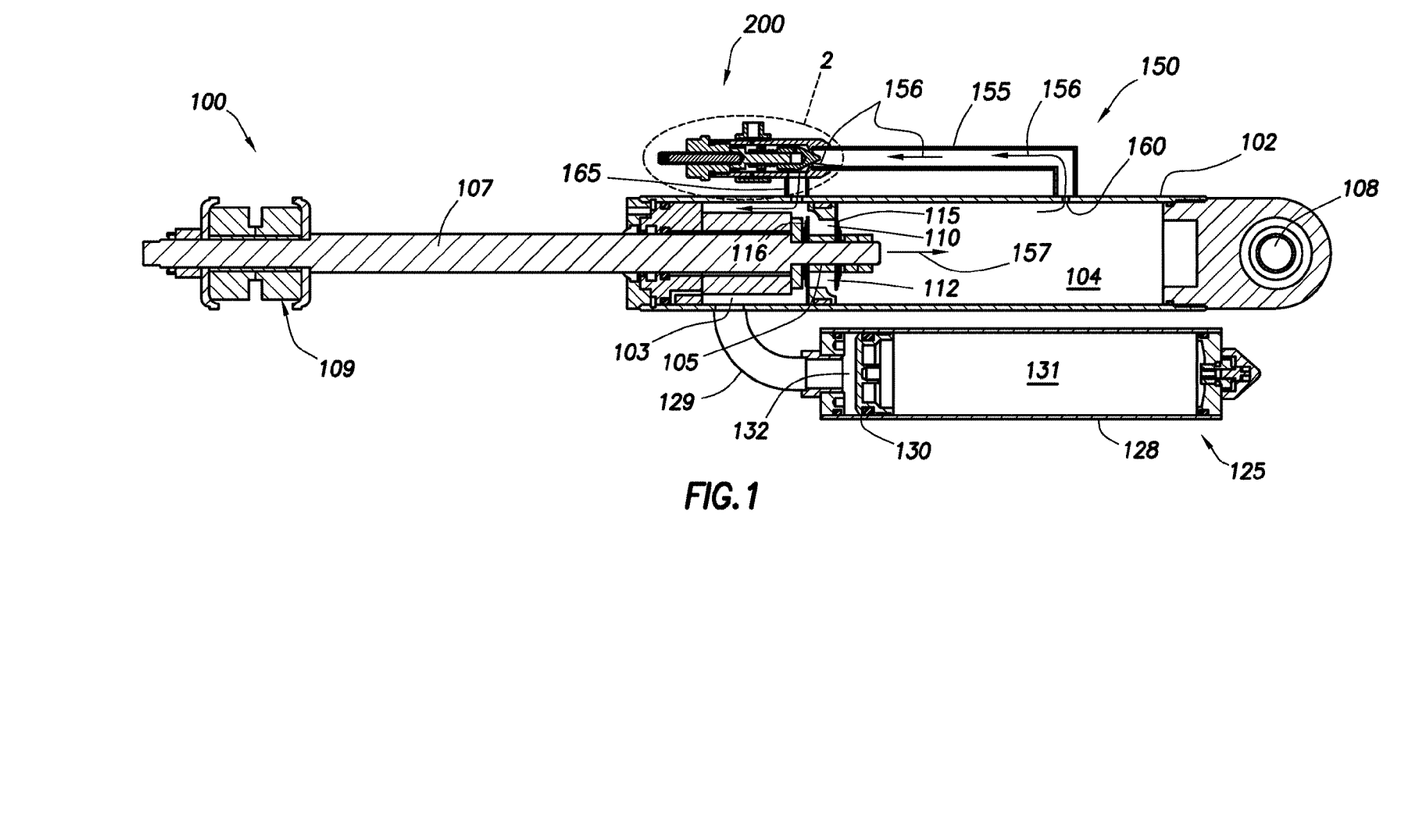
FIG. 1 is a section view showing a suspension damping unit with a bypass.

As used herein, the terms "down," "up," "downward," "upward," "lower," "upper" and other directional references are relative and are used for reference only. FIG. 1 is a section view of a suspension damping unit 100. The damper includes a cylinder portion 102 with a rod 107 and a piston 105. In one embodiment, the fluid meters from one side of the piston 105 to the other side by passing through flow paths 110, 112 formed in the piston 105. In the embodiment shown, shims 115, 116 are used to partially obstruct the flow paths 110, 112 in each direction. By selecting shims 115, 116 having certain desired stiffness characteristics, the dampening effects caused by the piston 105 can be increased or decreased and dampening rates can be different between the compression and rebound strokes of the piston 105. For example, shims 115 are configured to meter rebound flow from the rebound portion 103 of the cylinder 102 to the compression portion 104 of the cylinder 102. Shims 116, on the other hand, are configured to meter compression flow from the compression portion of the cylinder to the rebound portion. In one embodiment, shims 116 are not included on the rebound portion side, nor is there a compression flow path such as path 112, leaving the piston essentially "locked out" in the compression stroke without some means of flow bypass. Note that piston apertures (not shown) may be included in planes other than those shown (e.g. other than apertures used by paths 110 and 112) and further that such apertures may, or may not, be subject to the shims 115, 116 as shown (because for example, the shims 115, 116 may be clover-shaped or have some other non-circular shape). In one embodiment, the piston is solid and all damping flow must traverse a flow bypass and/or communicate with a reservoir.

A reservoir 125 is in fluid communication with the damper cylinder 102 for receiving and supplying damping fluid as the piston rod 107 moves in and out of the cylinder 102. The reservoir includes a cylinder portion 128 in fluid communication with the rebound portion 103 of the damper cylinder 102 via fluid conduit 129. The reservoir also includes a floating piston 130 with a volume of gas on a backside 131 ("blind end" side) of it, the gas being compressible as the reservoir cylinder 128, on the "frontside" 132 fills with damping fluid due to movement of the damper rod 107 and piston 105 into the damper cylinder 102. Certain features of reservoir type dampers are shown and described in U.S. Pat. No. 7,374,028, which is incorporated herein, in its entirety, by reference. The upper portion of the rod 107 is supplied with a bushing set 109 for connecting to a portion of a vehicle wheel suspension linkage. In another embodiment, not shown, the upper portion of the rod 107 (opposite the piston) may be supplied with an eyelet to be mounted to one part of the vehicle, while the lower part of the housing shown with an eyelet 108 is attached to another portion of the vehicle, such as the frame, that moves independently of the first part. A spring member (not shown) is usually mounted to act between the same portions of the vehicle as the damper. As the rod 107 and piston 105 move into cylinder 102 (during compression), the damping fluid slows the movement of the two portions of the vehicle relative to each other due, at least in part, to the incompressible fluid moving through the shimmed paths 112 (past shims 116) provided in the piston 105 and/or through a metered bypass 150, as will be described herein. As the rod 107 and piston 105 move out of the cylinder 102 (during extension or "rebound") fluid meters again through shimmed paths 110 and the flow rate and corresponding rebound rate is controlled, at least in part, by the shims 115.

In FIG. 1, the piston is shown at full extension and moving downward in a compression stroke, the movement shown by arrow 157. The bypass 150 includes a tubular body 155 that communicates with the damper cylinder 102 through entry 160 and exit 165 pathways. The bypass 150 permits damping fluid to travel from a first side of the piston 105 to the other side without traversing shimmed flow paths 110, 112 that may otherwise be traversed in a compression stroke of the damper. In FIG. 1, the bypass 150 is shown in an "open" position with the flow of fluid through the bypass shown by arrows 156 from a compression side to a rebound side of the piston 105. In the embodiment of FIG. 1, the bypass 150 includes a remotely controllable, needle-type check valve/throttle valve 200, located proximate an exit pathway 165 allowing flow in direction 156 and checking flow in opposite direction.

The entry pathway 160 to the bypass 150 in the embodiment shown in FIG. 1 is located towards a lower end of the damper cylinder 102. In one embodiment, as selected by design (e.g. axial location of entry 160), the bypass will not operate after the piston 105 passes the entry pathway 160 near the end of a compression stroke (or elsewhere in the stroke as desired). In one embodiment, this "position sensitive" feature ensures increased dampening will be in effect near the end of the compression stoke to help prevent the piston from approaching a "bottomed out" position (e.g. impact) in the cylinder 102. In some instances, multiple bypasses are used with a single damper and the entry pathways for each may be staggered axially along the length of the damper cylinder in order to provide an ever-increasing amount of dampening (via less bypass) as the piston moves through its compression stroke and towards the bottom of the damping cylinder. Each bypass may include some or all of the features described herein. Certain bypass damper features are described and shown in U.S. Pat. Nos. 6,296,092 and 6,415,895, each of which are incorporated herein, in its entirety, by reference. Additionally, the bypass and valve of the present embodiments can be used in any combination with the bypass valves shown and described in co-pending U.S. patent application Ser. Nos. 12/684,072 and 13/010,697.

Figure 2:
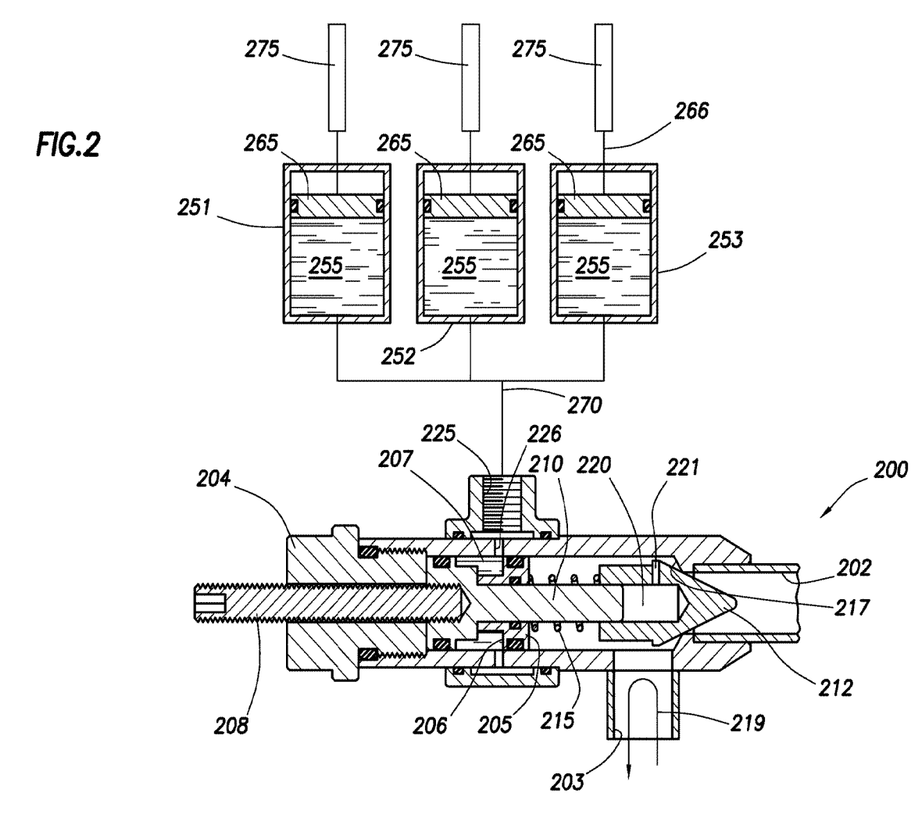
FIG. 2 is an enlarged section view showing a valve of the bypass in a closed position and showing a plurality of valve operating cylinders in selective communication with an annular piston surface of the valve.

FIGS. 2-5 are enlarged views showing the remotely operable needle valve 200 in various positions. FIG. 2 shows the valve 200 in a closed position (e.g. during a rebound stroke of the damper). The valve includes a valve body 204 housing a movable piston 205 which is sealed within the body. The piston 205 includes a sealed chamber 207 adjacent an annularly-shaped piston surface 206 at a first end thereof. The chamber 207 and piston surface 206 are in fluid communication with a port 225 accessed via opening 226. Two additional fluid communication points are provided in the body including an inlet 202 and an outlet 203 for fluid passing through the valve 200. Extending from a first end of the piston 205 is a shaft 210 having a cone-shaped valve member 212 (other shapes such as spherical or flat, with corresponding seats, will also work suitably well) disposed on an end thereof. The cone-shaped member 212 is telescopically mounted relative to, and movable on, the shaft 210 and is biased toward an extended position due to a spring 215 coaxially mounted on the shaft 210 between the member 212 and the piston 205. Due to the spring biasing, the cone-shaped member 212 normally seats itself against a seat 217 (as it is in FIG. 2) formed in an interior of the body 204. As shown, the cone shaped member 212 is seated against seat 217 due to the force of the spring 215 and absent an opposite force from fluid entering the valve along path 156 from the bypass (FIG. 1). As member 212 telescopes out, a gap 220 is formed between the end of the shaft 210 and an interior of member 212. A vent 221 is provided to relieve any pressure formed in the gap. With a fluid path through the valve (from 203 to 202) closed, fluid communication is substantially shut off from the rebound side of the cylinder into the valve body (and hence through the bypass back to the compression side) and its "dead-end" path is shown by arrow 219.

In one embodiment, there is a manual pre-load adjustment on the spring 215 permitting a user to hand-load or un-load the spring using a threaded member 208 that transmits motion of the piston 205 towards and away from the conical member, thereby changing the compression on the spring 215.

Also shown in FIG. 2 is a plurality of valve operating cylinders 251, 252, 253. In one embodiment, the cylinders each include a predetermined volume of fluid 255 that is selectively movable in and out of each cylindrical body through the action of a separate corresponding piston 265 and rod 266 for each cylindrical body. A fluid path 270 runs between each cylinder and port 225 of the valve body where annular piston surface 206 is exposed to the fluid. Because each cylinder has a specific volume of substantially incompressible fluid and because the volume of the sealed chamber 207 adjacent the annular piston surface 206 is known, the fluid contents of each cylinder can be used, individually, sequentially or simultaneously to move the piston a specific distance, thereby effecting the dampening characteristics of the system in a relatively predetermined and precise way. While the cylinders 251-253 can be operated in any fashion, in the embodiment shown each piston 265 and rod 266 is individually operated by a solenoid 275 and each solenoid, in turn, is operable from a remote location of the vehicle, like a cab of a motor vehicle or even the handlebar area of a motor or bicycle (not shown). Electrical power to the solenoids 275 is available from an existing power source of a vehicle or is supplied from its own source, such as on-board batteries. Because the cylinders may be operated by battery or other electric power or even manually (e.g. by syringe type plunger), there is no requirement that a so-equipped suspension rely on any pressurized vehicle hydraulic system (e.g. steering, brakes) for operation. Further, because of the fixed volume interaction with the bypass valve there is no issue involved in stepping from hydraulic system pressure to desired suspension bypass operating pressure.

Figure 3:
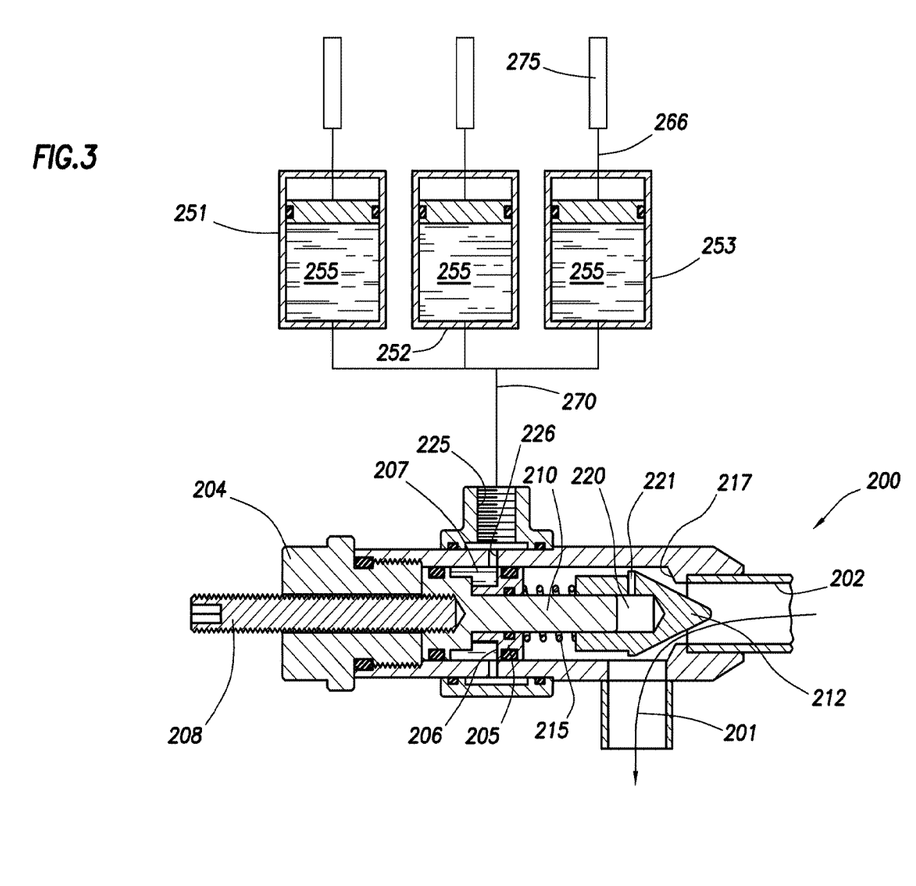
FIG. 3 is a section view showing the valve in an open position due to fluid flow through the bypass.

FIG. 3 is a section view showing the valve of FIG. 2 in an open position due to fluid flow. In the damping-open position, fluid flow through the bypass 150 provides adequate force on the member 212 to urge it backwards, at least partially loading the spring 215 and creating fluid path 201 from the bypass 150 into a rebound area 103 of the damper cylinder 102. The characteristics of the spring 215 are typically chosen to permit the valve 200 (e.g. member 212) to open at a predetermined bypass pressure, with a predetermined amount of control pressure applied to inlet 225, during a compression stroke of the damper 100. For a given spring 215, higher control pressure at inlet 225 will result in higher bypass pressure required to open the valve 200 and correspondingly higher damping resistance in the bypass 150 (more compression damping due to that bypass). In one embodiment, the control pressure at inlet 225 is raised high enough to effectively "lock" the bypass closed resulting in a substantially rigid compression damper (particularly true when a solid damping piston is also used).

In one embodiment, the valve is open in both directions when the valve member 212 is "topped out" against valve body 204. In another embodiment however, when the valve piston 205 is abutted or "topped out" against valve body 204 the spring 215 and relative dimensions of the valve 200 still allow for the cone member 212 to engage the valve seat 217 thereby closing the valve. In such embodiment backflow from the rebound side of the cylinder 102 to the compression side is always substantially closed and cracking pressure from flow along path 156 is determined by the pre-compression in the spring 215. In such embodiment, additional fluid pressure may be added to the inlet through port 225 to increase the cracking pressure for flow along path 156 and thereby increase compression damping through the bypass over that value provided by the spring compression "topped out." It is generally noteworthy that while the descriptions herein often relate to compression damping bypass and rebound shut off, some or all of the bypass channels (or channel) on a given suspension unit may be configured to allow rebound damping bypass and shut off or impede compression damping bypass.

Figure 4:
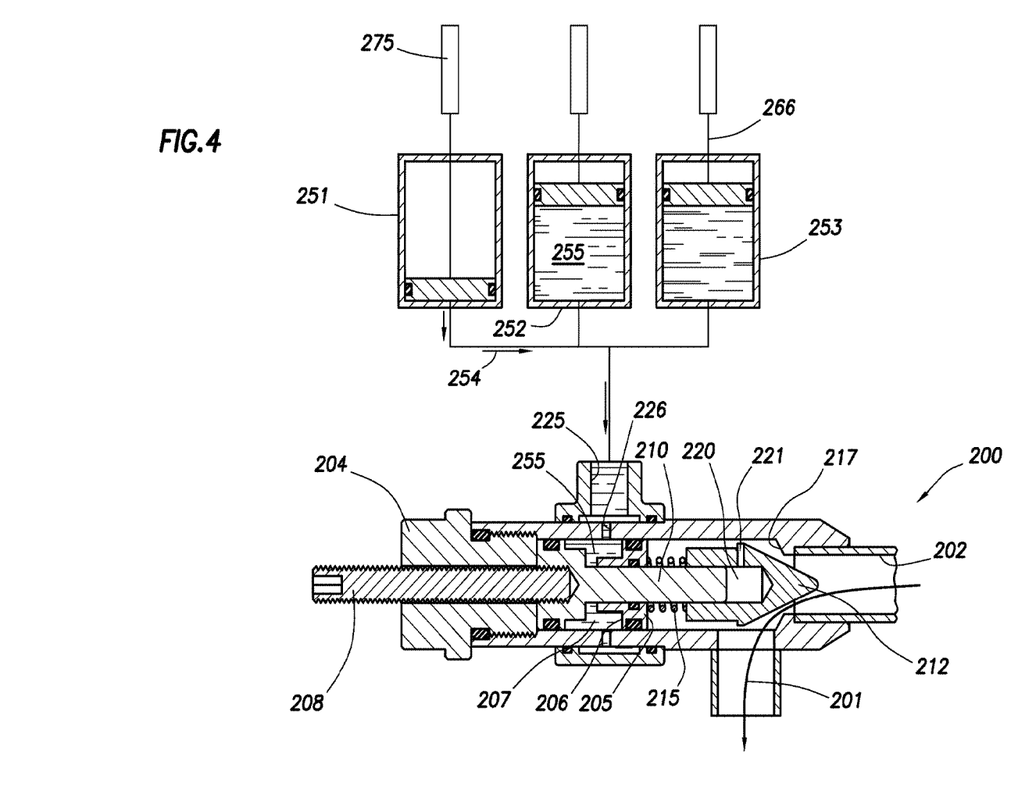
FIG. 4 is a section view showing the valve in an open position after the annular piston surface of the valve has been moved by the injection of fluid from a first valve operating cylinder.

FIG. 4 is a section view showing the valve 200 in an open position after the annular piston surface 206 of the valve has been moved by the injection of fluid from a first valve operating cylinder 251. Like FIG. 3, the valve 200 is also in a dampening-open position but the piston (and thus the spring 215) has been preloaded by the application of fluid to annular piston 206 from the first valve operating cylinder 251. As a result the fluid flow through the bypass required to move member 212 is increased. The valve operating cylinders 251-253 each include a predetermined, measured volume of fluid that is designed to cause the piston to move a specific amount, each thereby loading the spring 215 a specific known amount. For example, in FIG. 4 the first valve operating cylinder 251 has been emptied into sealed chamber 207 where it has acted on annular piston surface 206 and translated the piston a predetermined distance. The result is a further compression of the spring 215 thereby requiring a greater fluid flow on conical member 212 to force to open the bypass. The enlarged flow is illustrated by heavy arrow 201. The cylinders are designed to each contain a fluid volume that will create a desired movement of the piston when their contents are injected into the valve either alone or in combination. In one embodiment, for example, the cylinders are "plumbed" to operate in series and they can be sequentially emptied to increase dampening in discrete stages. The result is an increase in dampening every time another cylinder empties its contents. Conversely, causing the fluid volumes to return to their respective cylinders ensures that piston will return a certain distance, reducing dampening in the circuit as more fluid is permitted to bypass the effects of the piston shims.

In an example, when the valve 200 is in its normally closed position (shown in FIG. 2 with spring 215 relaxed), an area 'behind" the annular piston 205 has a 10 cc volume and is pre-filled with fluid. In order to translate the piston 205 to a point where dampening is increased a meaningful amount, the piston must move "forward" a distance that adds an additional 5 cc in volume to sealed area 207. By sizing cylinder 251 to hold a fluid volume of 5 cc, the piston 205 is ensured of moving forward to the desired position after the contents have been injected behind the annular piston surface 206.

Figure 5:
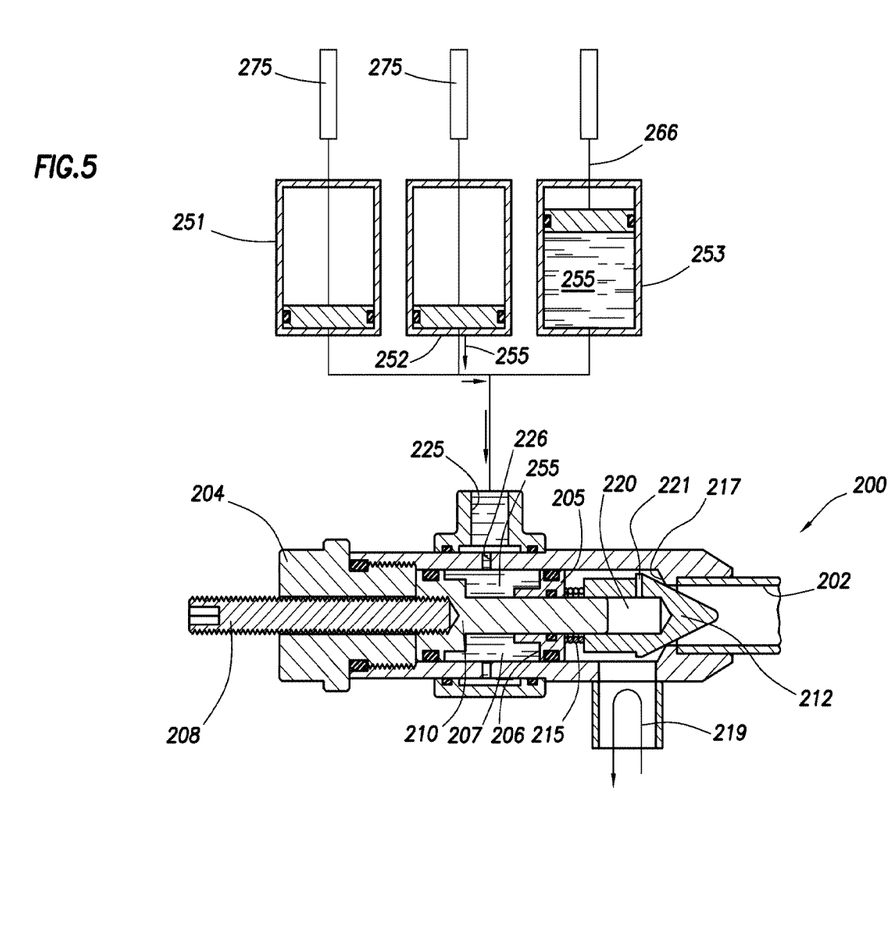
FIG. 5 is a section view showing the valve in a locked-out position due to fluid injected from the first and second operating cylinders.

In one embodiment, inlet 225 may be pressurized using one or more of the fluid cylinders 251-253 to shift the valve 200 to a third or "locked-out" position. FIG. 5 is a section view showing the valve 200 in a locked-out position due to fluid injected from the first and second operating cylinders 251, 252. Because the valve 200 is in a locked-out position fluid is prevented from flowing through the bypass in either direction regardless of compression or rebound stroke severity. An activating amount of fluid has been introduced via inlet 225 to act upon annular piston surface 206 and move the piston 205 and with it, member 212 toward seat 217. As illustrated, sufficient activating fluid has fully compressed the spring 215 (substantial stack out) thereby closing the cone member 212 against the seat 217 and sealing the bypass to both compression flow and rebound flow. In the embodiment shown, the valve 200 can be shifted to the third, locked-out position from either the first, closed position of FIG. 2 or the second, open position of FIG. 3, depending upon the operator cylinder or cylinders chosen and the fluid volume of those cylinders.

Note that when in the "locked out" position, the valve 200 as shown will open to compression flow if and when the compression flow pressure acting over the surface area of the seated valve cone member 212 exceeds the inlet 225 pressure acting over the surface area of the annular piston surface 206 (unless the cone member and valve assembly are mechanically "stacked out" such as by the mechanical screw adjuster). Such inlet 225 pressure is determined by the pistons, rods and solenoids that provide the force responsible for moving fluid between the operating cylinders and the closed area 207. Such pressure may be selected to correspond therefore to a desired compression overpressure relief value or "blow off" value thereby allowing compression bypass under "extreme" conditions even when the bypass is "locked out".

In the embodiment illustrated, the valve 200 is intended to be shifted to the locked-out position with control fluid acting upon annular piston surface 206 of piston 205. In one embodiment, the activating fluid via inlet 225 is sized so that the valve 200 is closed to rebound fluid (with the cone-shaped member 212 in seat 217) but with the spring 215 not fully compressed or stacked out. In such a position, a high enough compression force (e.g. compression flow) will still open the valve 200 and allow fluid to pass through the valve in a compression stroke. In one arrangement, the activating pressure, controlled remotely, may be adjusted between levels where the lock-out is not energized and levels where the lock-out is fully energized. The activating fluid may also be provided at intermediate levels to create more or less damping resistance through the bypass. Note that other separate damping valves (e.g. shims or pressure differential operated) may be added in the bypass channel generally to alter bypass damping characteristics inn compression or rebound or both. The various levels are possible by sizing, and in some cases combining the cylinders.

Figure 6:
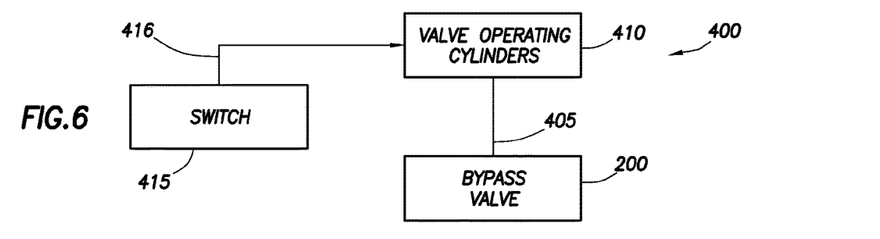
FIG. 6 is a schematic diagram showing a control arrangement for a remotely operated bypass.

FIG. 6 is a schematic diagram showing a control arrangement 400 for a remotely operated bypass. As illustrated, a signal line 416 runs from a switch 415 to any number of valve operating cylinders 410 which in turn, operate a bypass valve 200 via fluid path 405. While FIG. 6 is simplified and involves control of a single bypass valve 200, it will be understood that any number of valves and groups of control cylinders could be operated simultaneously or separately depending upon needs in a vehicular suspension system. Additional switches could permit individual operation of separate damper bypass valves.

Figures 7, 8:
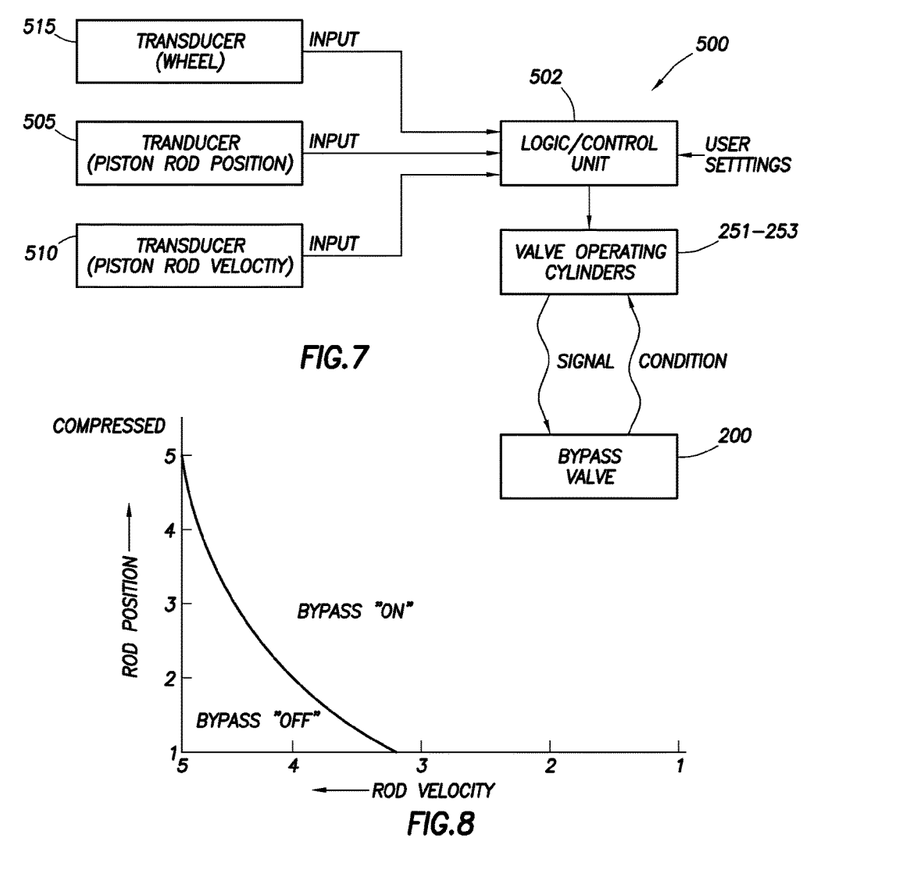
FIG. 7 is a schematic diagram showing another control arrangement for a remotely operated bypass.
FIG. 8 is a graph showing some operational characteristics of the arrangement of FIG. 7.

A remotely operable bypass like the one described above is particularly useful with an on-/off-road vehicle. These vehicles can have as more than 20" of shock absorber travel to permit them to negotiate rough, uneven terrain at speed with usable shock absorbing function. In off-road applications, compliant dampening is necessary as the vehicle relies on its long travel suspension when encountering often large off-road obstacles. Operating a vehicle with very compliant, long travel suspension on a smooth road at higher speeds can be problematic due to the springiness/sponginess of the suspension and corresponding vehicle handling problems associated with that (e.g. turning roll, braking pitch). Such compliance can cause reduced handling characteristics and even loss of control. Such control issues can be pronounced when cornering at high speed as a compliant, long travel vehicle may tend to roll excessively. Similarly, such a vehicle may pitch and yaw excessively during braking and acceleration. With the remotely operated bypass dampening and "lock out" described herein, dampening characteristics of a shock absorber can be completely changed from a compliantly dampened "springy" arrangement to a highly dampened and "stiffer" (or fully locked out) system ideal for higher speeds on a smooth road. In one embodiment, where compression flow through the piston is completely blocked, closure of the bypass 150 results in substantial "lock out" of the suspension (the suspension is rendered essentially rigid). In one embodiment, where some compression flow is allowed through the piston (e.g. port 112 and shims 116), closure of the bypass 150 (closure of valve 200) results in a stiffer but still functional compression damper. In one embodiment, some of the bypass channels, of for example a shock having multiple bypass channels, having corresponding compression flow entries located "deeper" in the compression stroke are locked out (or restricted) while bypass channels having entries "higher" in the stroke are left open. That results in a long travel shock absorber being functionally converted to a much shorter travel shock absorber for, in one example, on highway use (in the short travel mode). Such a short travel mode is further advantageous in that it allows for elimination of undesired travel from the end of the stroke as opposed to causing a shortening of the damper. As such, the ride height of a so equipped vehicle is unaffected by travel mode adjustment from long to short. In one embodiment, the shims 116 are sized, to optimize damping when the bypass 150 is open and when bypass 150 is closed based on total anticipated driving conditions. In one FIG. 7 illustrates, for example, a system 500 including three variables: rod speed, rod position and vehicle speed. Any or all of the variables shown may be considered by logic unit 502 in controlling the solenoids of the valve operating cylinders 251-253. Any other suitable vehicle operation variable may be used in addition to or in lieu of the variables 515, 505, 510 such as, for example, piston rod compression strain, eyelet strain, vehicle mounted accelerometer (or tilt/inclinometer) data or any other suitable vehicle or component performance data. In one embodiment, piston 105's position within cylinder 102 is determined using an accelerometer to sense modal resonance of cylinder 102. Such resonance will change depending on the position of the piston 105 and an on-board processor (computer) is calibrated to correlate resonance with axial position. In one embodiment, a suitable proximity sensor or linear coil transducer or other electro-magnetic transducer is incorporated in the dampening cylinder to provide a sensor to monitor the position and/or speed of the piston (and suitable magnetic tag) with respect to the cylinder. In one embodiment, the magnetic transducer includes a waveguide and a magnet, such as a doughnut (toroidal) magnet that is joined to the cylinder and oriented such that the magnetic field generated by the magnet passes through the piston rod and the waveguide. Electric pulses are applied to the waveguide from a pulse generator that provides a stream of electric pulses, each of which is also provided to a signal processing circuit for timing purposes. When the electric pulse is applied to the waveguide, a magnetic field is formed surrounding the waveguide. Interaction of this field with the magnetic field from the magnet causes a torsional strain wave pulse to be launched in the waveguide in both directions away from the magnet. A coil assembly and sensing tape is joined to the waveguide. The strain wave causes a dynamic effect in the permeability of the sensing tape which is biased with a permanent magnetic field by the magnet. The dynamic effect in the magnetic field of the coil assembly due to the strain wave pulse, results in an output signal from the coil assembly that is provided to the signal processing circuit along signal lines. By comparing the time of application of a particular electric pulse and a time of return of a sonic torsional strain wave pulse back along the waveguide, the signal processing circuit can calculate a distance of the magnet from the coil assembly or the relative velocity between the waveguide and the magnet. The signal processing circuit provides an output signal, either digital or analog, proportional to the calculated distance and/or velocity. A transducer-operated arrangement for measuring rod speed and velocity is described in U.S. Pat. No. 5,952,823 and that patent is incorporated by reference herein in its entirety.

While a transducer assembly located at the damper measures rod speed and location, a separate wheel speed transducer for sensing the rotational speed of a wheel about an axle includes housing fixed to the axle and containing therein, for example, two permanent magnets. In one embodiment, the magnets are arranged such that an elongated pole piece commonly abuts first surfaces of each of the magnets, such surfaces being of like polarity. Two inductive coils having flux-conductive cores axially passing therethrough abut each of the magnets on second surfaces thereof, the second surfaces of the magnets again being of like polarity with respect to each other and of opposite polarity with respect to the first surfaces. Wheel speed transducers are described in U.S. Pat. No. 3,986,118 which is incorporated herein by reference in its entirety.

In one embodiment, as illustrated in FIG. 7, the logic unit 502 with user-definable settings receives inputs from the rod speed 510 and location 505 transducers as well as the wheel speed transducer 515. The logic unit 502 is user-programmable and depending on the needs of the operator, the unit records the variables and then if certain criteria are met, the logic circuit sends its own signal to the bypass to either close or open (or optionally throttle) the bypass valve 200. Thereafter, the condition of the bypass valve is relayed back to the logic unit 502.

FIG. 8 is a graph that illustrates a possible operation of one embodiment of the bypass system 500 of FIG. 7. The graph assumes a constant vehicle speed. For a given vehicle speed, rod position is shown on a y axis and rod velocity is shown on an x axis. The graph illustrates the possible on/off conditions of the bypass at combinations of relative rod position and relative rod velocity. For example, it may be desired that the bypass is operable (bypass "on") unless the rod is near its compressed position and/or the rod velocity is relatively high (such as is exemplified in FIG. 7). The on/off configurations of FIG. 7 are by way of example only and any other suitable on/off logic based on the variable shown or other suitable variables may be used. In one embodiment, it is desirable that the damper become relatively stiff at relatively low rod velocities and low rod compressive strain (corresponding for example to vehicle roll, pitch or yaw) but remains compliant in other positions. In one embodiment, the piston rod 107 includes a "blow off" (overpressure relief valve typically allowing overpressure flow from the compression side to the rebound side) valve positioned in a channel coaxially disposed though the rod 107 and communicating one side of the piston (and cylinder) with the other side of the piston (and cylinder) independently of the apertures 110,112 and the bypass 150.

In one embodiment, the logic shown in FIG. 7 assumes a single damper but the logic circuit is usable with any number of dampers or groups of dampers. For instance, the dampers on one side of the vehicle can be acted upon while the vehicles other dampers remain unaffected.

While the examples illustrated relate to manual operation and automated operation based upon specific parameters, the remotely operated bypass 150 can be used in a variety of ways with many different driving and road variables. In one example, the bypass 150 is controlled based upon vehicle speed in conjunction with the angular location of the vehicle's steering wheel. In this manner, by sensing the steering wheel turn severity (angle of rotation), additional dampening can be applied to one damper or one set of dampers on one side of the vehicle (suitable for example to mitigate cornering roll) in the event of a sharp turn at a relatively high speed. In another example, a transducer, such as an accelerometer, measures other aspects of the vehicle's suspension system, like axle force and/or moments applied to various parts of the vehicle, like steering tie rods, and directs change to the bypass valve positioning in response thereto. In another example, the bypass can be controlled at least in part by a pressure transducer measuring pressure in a vehicle tire and adding dampening characteristics to some or all of the wheels in the event of, for example, an increased or decreased pressure reading. In one embodiment, the damper bypass or bypasses are controlled in response to braking pressure (as measured, for example, by a brake pedal sensor or brake fluid pressure sensor or accelerometer). In still another example, a parameter might include a gyroscopic mechanism that monitors vehicle trajectory and identifies a "spin-out" or other loss of control condition and adds and/or reduces dampening to some or all of the vehicle's dampers in the event of a loss of control to help the operator of the vehicle to regain control.

While the foregoing is directed to embodiments of the present invention, other and further embodiments of the invention may be devised without departing from the basic scope thereof, and the scope thereof is determined by the claims that follow.

What is claimed is:

1. A vehicle suspension damper comprising:
  a cylinder containing a fluid and a damping piston operable to travel within said fluid in said cylinder, said vehicle suspension damper further including a passageway through said damping piston and limiting a flow rate of said fluid through said damping piston in at least one direction;
  a bypass pathway in fluid communication with said cylinder, said bypass pathway providing a path for said fluid to travel between a first side and a second side of said damping piston;
  a valve for controlling a flow of said fluid through said bypass pathway, said valve comprising:
    a valve body;
    a valve piston housed within said valve body, said valve piston having a valve piston surface;
    a shaft extending from said valve piston;
    a valve member coupled to said shaft, said valve member telescopically mounted to said shaft and said valve member movable with respect to said shaft wherein a gap is formed between said valve member and an end of said shaft;

a spring member mounted on said shaft between said valve member and said valve piston, said spring member biasing said valve member away from said valve piston; and a manual pre-load adjustment coupled to said valve piston, said manual pre-load adjustment configured to adjust a position of said valve piston; and at least one predetermined fluid volume in selective fluid communication with said valve piston surface for causing displacement of said valve piston; wherein the valve is remotely controllable.

2. The vehicle suspension damper of claim 1 wherein said valve further comprises:

a chamber in fluid communication with said valve piston surface; and a port in fluid communication with said chamber and said valve piston surface.

3. The vehicle suspension damper of claim 2 wherein said predetermined fluid volume is in said selective fluid communication with said valve piston surface via a fluid pathway including said port and said chamber.

4. The vehicle suspension damper of claim 1 wherein said valve member is cone-shaped.

5. The vehicle suspension damper of claim 1 wherein said valve further comprises:

a seat formed in an interior of said valve body, said seat configured to engage with said valve member, said valve in said closed position when said seat engages said valve member.

6. The vehicle suspension damper of claim 1 wherein said valve further comprises:

a vent coupled to said gap, said vent configured to relieve pressure formed in said gap.

7. A suspension damper comprising:

a cylinder containing a fluid and a damping piston operable to travel within said fluid in said cylinder, said suspension damper further including a passageway through said damping piston and limiting a flow rate of said fluid through said damping piston in at least one direction;

a bypass pathway in fluid communication with said cylinder, said bypass pathway providing a path for said fluid to travel between a first side and a second side of said damping piston;

a valve for controlling a flow of said fluid through said bypass pathway, said valve comprising:

a valve body;

a valve piston housed within said valve body, said valve piston having a valve piston surface;

a shaft extending from said valve piston;

a valve member coupled to said shaft, said valve member telescopically mounted to said shaft and said valve member movable with respect to said shaft wherein a gap is formed between said valve member and an end of said shaft; and a spring member mounted on said shaft between said valve member and said valve piston, said spring member biasing said valve member away from said valve piston; and at least one predetermined fluid volume in selective fluid communication with said valve piston surface for causing displacement of said valve piston; wherein the valve is remotely controllable, wherein operation of said at least one predetermined fluid volume does not require use of a pressurized hydraulic system of a vehicle to which said suspension damper is coupled.

8. The suspension damper of claim 7 wherein said operation of said at least one predetermined fluid volume is powered by an existing power supply of a vehicle to which said suspension damper is coupled.

9. The suspension damper of claim 7 wherein said operation of said at least one predetermined fluid volume is not powered by an existing power supply of a vehicle to which said suspension damper is coupled.

10. The suspension damper of claim 7 wherein electrical power for operation of said at least one predetermined fluid volume is supplied by on-board batteries of an existing power supply for a vehicle to which said suspension damper is coupled.

11. The suspension damper of claim 7, wherein said valve further comprises:

a manual pre-load adjustment coupled to said valve piston, said manual pre-load adjustment configured to adjust a position of said valve piston.

12. A suspension damper comprising:

a cylinder containing a fluid and a damping piston operable to travel within said fluid in said cylinder, said suspension damper further including a passageway through said damping piston and limiting a flow rate of said fluid through said damping piston in at least one direction;

a bypass pathway in fluid communication with said cylinder, said bypass pathway providing a path for said fluid to travel between a first side and a second side of said damping piston;

a valve for controlling a flow of said fluid through said bypass pathway, said valve comprising:

a valve body;

a valve piston housed within said valve body, said valve piston having a valve piston surface;

a shaft extending from said valve piston;

a valve member coupled to said shaft, said valve member telescopically mounted to said shaft and said valve member movable with respect to said shaft wherein a gap is formed between said valve member and an end of said shaft; and a spring member mounted on said shaft between said valve member and said valve piston, said spring member biasing said valve member away from said valve piston; and at least one predetermined fluid volume in selective fluid communication with said valve piston surface for causing displacement of said valve piston; wherein said valve is remotely controllable based upon data corresponding to said suspension damper, said data selected from the group consisting of: speed of a damper piston rod of said suspension damper, compression strain of said damper piston rod of said suspension damper, and eyelet strain of said suspension damper.

13. The suspension damper of claim 12, wherein said valve further comprises:

a manual pre-load adjustment coupled to said valve piston, said manual pre-load adjustment configured to adjust a position of said valve piston.

14. A suspension damper comprising:

a cylinder containing a fluid and a damping piston operable to travel within said fluid in said cylinder, said suspension damper further including a passageway through said damping piston and limiting a flow rate of said fluid through said damping piston in at least one direction;

a bypass pathway in fluid communication with said cylinder, said bypass pathway providing a path for said fluid to travel between a first side and a second side of said damping piston;

a valve for controlling a flow of said fluid through said bypass pathway, said valve comprising:

a valve body;

a valve piston housed within said valve body, said valve piston having a valve piston surface;

a shaft extending from said valve piston;

a valve member coupled to said shaft, said valve member telescopically mounted to said shaft and said valve member movable with respect to said shaft wherein a gap is formed between said valve member and an end of said shaft; and a spring member mounted on said shaft between said valve member and said valve piston, said spring member biasing said valve member away from said valve piston; and at least one predetermined fluid volume in selective fluid communication with said valve piston surface for causing displacement of said valve piston; wherein said valve is remotely controllable based upon vehicle operation variables corresponding to a vehicle to which said suspension damper is coupled, said vehicle operation variables selected from the group consisting of: vehicle speed, vehicle accelerometer data, vehicle wheel speed, steering wheel rotation for said vehicle, vehicle tire pressure, axle/tie rod forces for said vehicle, braking pressure, and vehicle trajectory.

15. The suspension damper of claim 14, wherein said valve further comprises:

a manual pre-load adjustment coupled to said valve piston, said manual pre-load adjustment configured to adjust a position of said valve piston.

16. A suspension damper comprising:

a cylinder containing a fluid and a damping piston operable to travel within said fluid in said cylinder, said suspension damper further including a passageway through said damping piston and limiting a flow rate of said fluid through said damping piston in at least one direction;

a bypass pathway in fluid communication with said cylinder, said bypass pathway providing a path for said fluid to travel between a first side and a second side of said damping piston;

a valve for controlling a flow of said fluid through said bypass pathway, said valve comprising:

a valve body;

a valve piston housed within said valve body, said valve piston having a valve piston surface;

a shaft extending from said valve piston;

a valve member coupled to said shaft, said valve member telescopically mounted to said shaft and said valve member movable with respect to said shaft wherein a gap is formed between said valve member and an end of said shaft; and a spring member mounted on said shaft between said valve member and said valve piston, said spring member biasing said valve member away from said valve piston; and at least one predetermined fluid volume in selective fluid communication with said valve piston surface for causing displacement of said valve piston; wherein said valve is remotely controllable based upon data corresponding to said suspension damper, said data selected from the group consisting of: speed of a damper piston rod of said suspension damper, compression strain of said damper piston rod of said suspension damper, and eyelet strain of said suspension damper; and wherein said valve is remotely controllable based upon vehicle operation variables corresponding to said vehicle, said vehicle operation variables selected from the group consisting of: vehicle speed, vehicle accelerometer data, vehicle wheel speed, steering wheel rotation for said vehicle, vehicle tire pressure, axle/tie rod forces for said vehicle, braking pressure, and vehicle trajectory.

17. The suspension damper of claim 16, wherein said valve further comprises:

a manual pre-load adjustment coupled to said valve piston, said manual pre-load adjustment configured to adjust a position of said valve piston.

\* \* \* \* \*

UNITED STATES PATENT AND TRADEMARK OFFICE
CERTIFICATE OF CORRECTION

PATENT NO. : 10,094,443 B2
APPLICATION NO. : 15/455811
DATED : October 9, 2018
INVENTOR(S) : John Marking

Page 1 of 1

It is certified that error appears in the above-identified patent and that said Letters Patent is hereby corrected as shown below:

On the Title Page

Page 5, Column 2, Other Publications, Lines 36 and 37:
Delete: "Statement of Grounds of Appeal, EP App. No. 11153607A, May 28, 2018, 88 Pages."
Insert: --Statement of Grounds of Appeal, EP App. No. 11153607.4, May 28, 2018, 88 Pages.--

Signed and Sealed this
Twentieth Day of November, 2018

Andrei Iancu
*Director of the United States Patent and Trademark Office*